United States Patent [19]

Heilig, Jr. et al.

[11] Patent Number: 4,476,922
[45] Date of Patent: Oct. 16, 1984

[54] FORCED BILATERAL THERMOSIPHON LOOP

[76] Inventors: Glenn M. Heilig, Jr.; Joseph M. Gamewell, both of P.O. Box 2309, Salisbury, N.C. 28144

[21] Appl. No.: 314,628

[22] Filed: Oct. 26, 1981

[51] Int. Cl.³ .............................................. F28D 15/00
[52] U.S. Cl. .................. 165/104.25; 165/54; 165/97; 165/104.14; 165/104.22
[58] Field of Search ............ 165/104.25, 104.14, 165/DIG. 12, 104.22, 54, 97

[56] References Cited

U.S. PATENT DOCUMENTS

| | | | |
|---|---|---|---|
| 3,202,134 | 8/1965 | Marcheix | 165/104.25 |
| 3,618,659 | 11/1971 | Rawal | 165/DIG. 12 |
| 4,091,547 | 5/1978 | Leigh | 165/DIG. 12 |
| 4,109,705 | 8/1978 | Bergdahl | 165/DIG. 12 |
| 4,142,575 | 3/1979 | Glancy | 165/DIG. 12 |
| 4,295,342 | 10/1981 | Parro | 165/104.21 X |
| 4,333,517 | 6/1982 | Parro | 165/104.21 X |
| 4,373,576 | 2/1983 | Strupczewski | 165/97 X |

FOREIGN PATENT DOCUMENTS 155187 3/1980 Japan .............................. 165/104.14

*Primary Examiner*—Albert W. Davis, Jr.

[57] ABSTRACT

Heat exchangers are placed in heat exchange relationship with each of an incoming and exhaust airstream and connected by a supply and return conduit. A pump is placed in the conduit from a reservoir or receiver adjacent the cooler of the two airstreams to the warmer of the two airstreams.

6 Claims, 4 Drawing Figures

FORCED BILATERAL THERMOSIPHON LOOP

BACKGROUND AND SUMMARY OF THE PRESENT INVENTION

The present invention is directed to air treatment systems and more particularly to an efficient method of recovering the beneficial characteristics of an exhaust airstream in a building or structure and providing such beneficial characteristics to the incoming or supply airstream. This technique may be useful either in summer or winter months, however, finds most use during winter months. For example, in winter months the exhaust airstream is going to be warmer than the incoming airstream and can be used to "pre-heat" the incoming airstream by giving up heat thereto.

It has become in recent years a well known and often used broad concept to utilize exhaust heat from some type of furnace or similar apparatus to preheat either directly or indirectly an incoming or supply airstream. Such is shown in U.S. Pat. No. 4,091,547 to Leigh; as well as various other prior art references. In direct situations the exhaust air passes in heat exchange relation to the supply air. In indirect situations a working fluid is utilized in a conduit system between the two air streams. In the hot stream the working fluid picks up heat and in the cooler airstream the working fluid gives up heat. Further, if the working fluid is "two-phase" it vaporizes in the hot airstream and condenses in the cooler airstream. One problem with indirect heat exchange processes that utilize a two-phase working fluid in prior art devices, however, is that either the two airstreams must be side-by-side, as illustrated by U.S. Pat. No. 4,230,173 to Eastman et al, or else the heat exchanger in the cooler airstream (condenser) must be at a higher elevation than the heat exchanger of the warm airstream (vaporizer) so that the condensate will return to the warm air heat exchanger. Obviously in the case of commercial and industrial buildings, it is generally not advantageous to provide the incoming air conduit adjacent the exhaust air conduit as it may be very expensive. Also, it is generally not desirable or economically feasible to place the heat exchanger of the cooler airstream at an elevation above that of the heat exchanger in the warm airstream. This is particularly true in situations where heat exchange is required or desired in both winter and summer operations, because in such situations the two airstreams are opposite in summer and winter. In other words, during winter operation, the condensate will form adjacent the incoming airstream while in summer operation the condensate will form adjacent the exhaust airstream. Therefore, a change in elevation would not allow for year round applicability.

It is further acknowledged by the present applicant that there are some isolated instances where it is known that heat exchangers may be connected by pipe work for the circulation of working fluid or refrigerant between them by pumping the condensed refrigerant from the cooler of the heat exchangers to the warmer heat exchanger. For example, see U.S. Pat. No. 4,091,547 to Leigh. However, this is a one way application utilized in connection with the operation of a grain drying kiln, and the same problems do not exist.

In the present invention, however, heat exchangers are placed in both the incoming and exhaust airstream of a commercial or industrial air treatment system. A pump is placed in the conduit between the two heat exchangers and a two-phase working fluid is utilized in connection therewith. As a result of the combination of the present invention, higher efficiencies may be obtained at lower operating costs. Since the working fluid is pumped between the two heat exchangers, less heat transfer surface is required because of the high heat transfer rate associated with the two-phase working fluid, as opposed to the situation which would be present if water were utilized in the conduits. With the present invention there is no need to either run supply and exhaust airstreams side-by-side or situate the heat exchanger of the hot airstream below that of the cold airstream. In fact the airstreams may be separated by as much as a hundred feet or more.

In general, the present invention is directed to a heat exchange system for use in connection with incoming and exhaust airstreams, which airstreams may be side-by-side, separated by a hundred feet or more, and at different elevations. The system includes at least one heat exchanger in the incoming airstream and at least one heat exchanger in the exhaust airstream, and the two heat exchangers are connected by supply and return conduits which carry a two-phase working fluid back and forth between the two heat exchangers. As an improved setup, a reversible or bi-directional pump in one of the conduits forces or pumps condensed working fluid from the outlet of the heat exchanger in the cooler airstream to the inlet of the heat exchanger in the warm airstream. Since the pump is bi-directional the system economies may be achieved in either winter or summer operation.

In an alternate embodiment, a second identical system with an additional heat exchanger in each airstream and conduits is added to increase the efficiency of the system by approximately an additional 50%. In such a case the two systems are arranged in counterflow arrangement so that the hot exhaust air entering the first coil (heat exchanger) sees a higher evaporating temperature than the air entering the second coil (heat exchanger).

It is therefore an object of the present invention to provide an improved heat exchange system for air treatment systems having an incoming and exhaust airstream, especially in situations where the incoming and exhaust airstream are separated by considerable distance or in which one of the airstreams is at a different elevation than the other.

It is another object of the present invention to provide an improved heat exchange system of the type described which utilizes a two-phase working fluid.

It is yet another object of the present invention to provide an improved heat exchange system of the type described in which the condensed working fluid is pumped from the cooler airstream to the warmer airstream, whereby the setup is applicable in situations where it would not otherwise operate and whereby the efficiency is considerably improved.

Other objects and a fuller understanding of the present invention will become apparent from reading the following detailed description of a preferred embodiment along with the accompanying drawings in which.

DETAILED DESCRIPTION OF A PREFERRED EMBODIMENT

Figure 1:
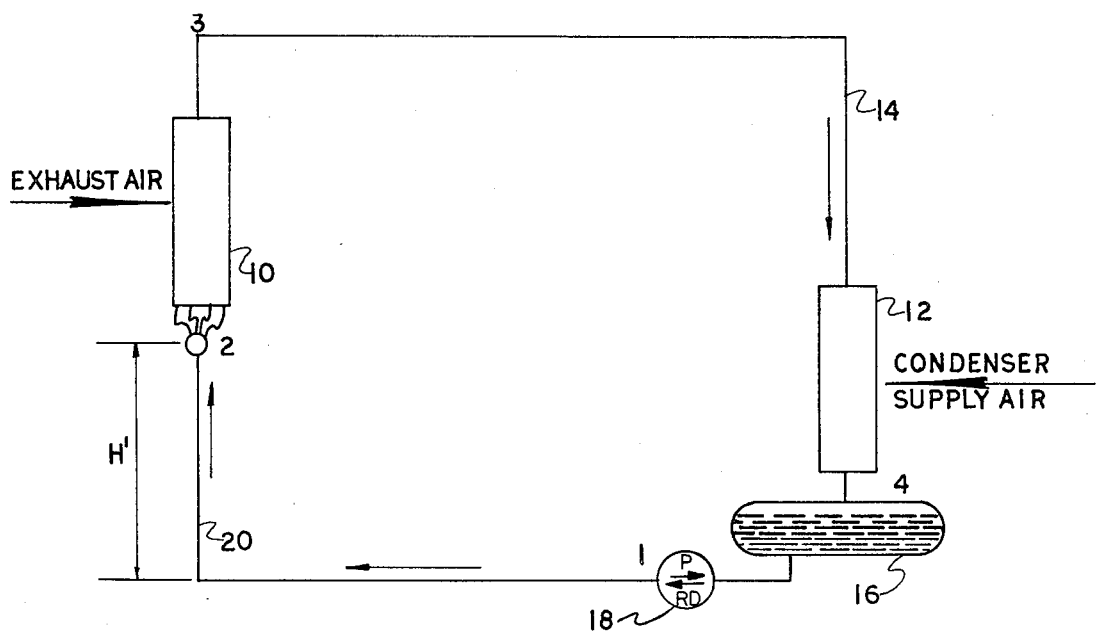
FIG. 1 is a schematic representation of the system according to the present invention.

Turning now to the drawings, there is illustrated in FIG. 1 a thermosiphon loop (heat exchange system) in which the exhaust airstream and the incoming airstream are separated by a distance of fifty feet or more, and in which a first heat exchanger 10 is positioned in the exhaust airstream. While the details of the heat exchanger itself are not disclosed, various type of heat exchangers might be utilized, as for example, a plurality of tubes (coil) through which a two-phase fluid passes and over which the exhaust air passes. A second heat exchanger 12 is placed in the supply airstream and may be identical to heat exchanger 10. A conduit 14 connects the output of heat exchanger 10 with the input of heat exchanger 12. The condensate from heat exchanger 12 passes into a receiver or reservoir 16 and is pumped by means of a liquid pump 18 through return conduit 20 to the input of heat exchanger 10. While the receiver is not mandatory, it does increase the efficiency as it allows the condenser coil to remain "dry" (drained) so that the condensing surface is maximized. This forms the basic thermosiphon loop of the present invention.

It should be noted at this time that the illustration of FIG. 1 is designed for winter operation in which the exhaust air is warm and the supply air is cold. The system could be slightly modified to operate in both winter and summer conditions if the pump 18 were made a bi-directional pump and the evaporator or heat exchanger 10 were also provided with a reservoir adjacent thereto. In this situation, the refrigerant would flow in the opposite direction as shown in FIG. 1.

As far as the working fluid is concerned, there are various types of two-phase working fluids which could be utilized, however, R-12 freon is preferred. It is only necessary that the working fluid be so selected as to change phases at temperatures below that of the warmer of the airstreams and above that of the cooler of the airstreams. Obviously other freons as well as other two-phase fluids could be used.

In operation the liquid is pumped (pressure increase) from condition 4 to condition 1 and for this purpose the head pressure of pump 18 is only high enough to overcome line losses and elevation to prevent "flashing" (vaporization) of the liquid in the line which occurs to return the condensate to condition 2. At condition 2, the liquid is distributed into a finned tube coil 10 (heat exchanger) placed in the hot exhaust airstream. The liquid absorbs the energy from the hot exhaust airstream, evaporates and leaves the coil as a hot, saturated, slightly superheated vapor at condition 3. This vapor then naturally travels from condition 3 to another finned tube coil 12 which is placed in the cold supply airstream. In this coil the saturated vapor gives up its energy to the cold airstream and condenses back into the liquid, thus heating the supply air. The liquid drains from the condenser coil 12 into a receiver 16 at condition 4 to complete the cycle.

Figure 2:
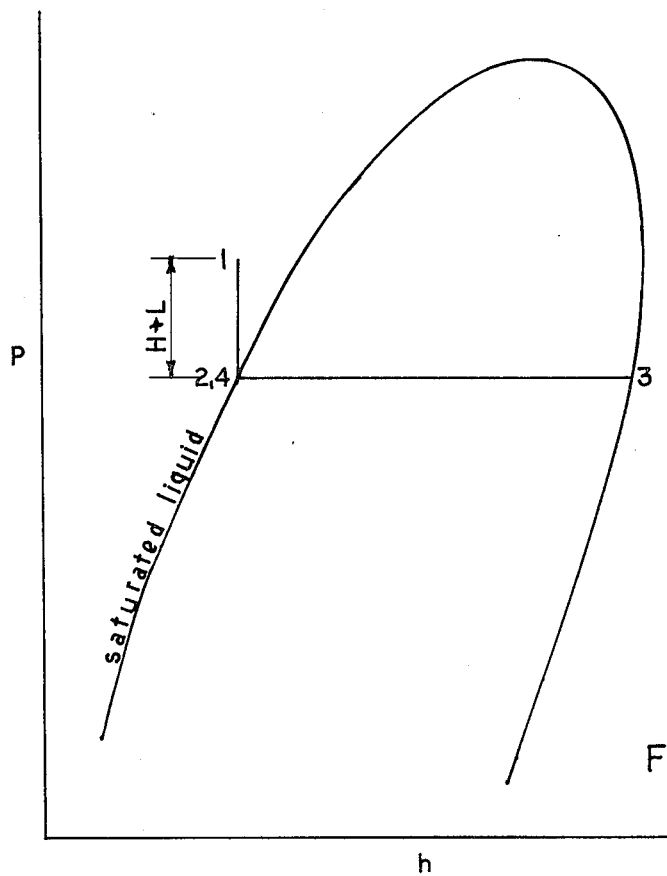
FIG. 2 is an enthalpy/pressure curve of the arrangement illustrated in FIG. 1.

Looking now at the enthalpy/pressure curve of FIG. 2, there is shown the enthalpy/pressure curve for R-12 plotted on a chart which shows enthalpy versus pressure. As is well known, everything to the left of the left-hand portion of the saturated liquid line is a liquid, everything to the right-hand portion of the curve is a gas, and therebetween is a combination liquid and gas.

Following the route of FIG. 1, the condensate from condenser 12 which is shown at condition 4 is pumped up to condition 1 as it leaves the pump, so that the line loss and head loss will drop the condensate back down to point 2 (same as condition 4) prior to the evaporation phase which follows the curve from point 2 to point 3. The vapor is then introduced to the condenser (heat exchanger 12 in supply airstream) and as it condenses, it gives up its heat to the airstream as represented by line 3-4. The longer the line 3-4 the more heat energy given up. Keeping in mind that the first object of the invention is to ensure that the condensate returns to the evaporator, from the above chart of FIG. 2, it can be seen that a second object of the present invention is to ensure that the condensing phase occurs between points on the left-hand saturated liquid line and the right-hand saturated liquid line. Without the pumping action one can see from the dotted line portion of FIG. 2 the difference in efficiency as the line 3-4 would be considerably shorter.

Figure 3:
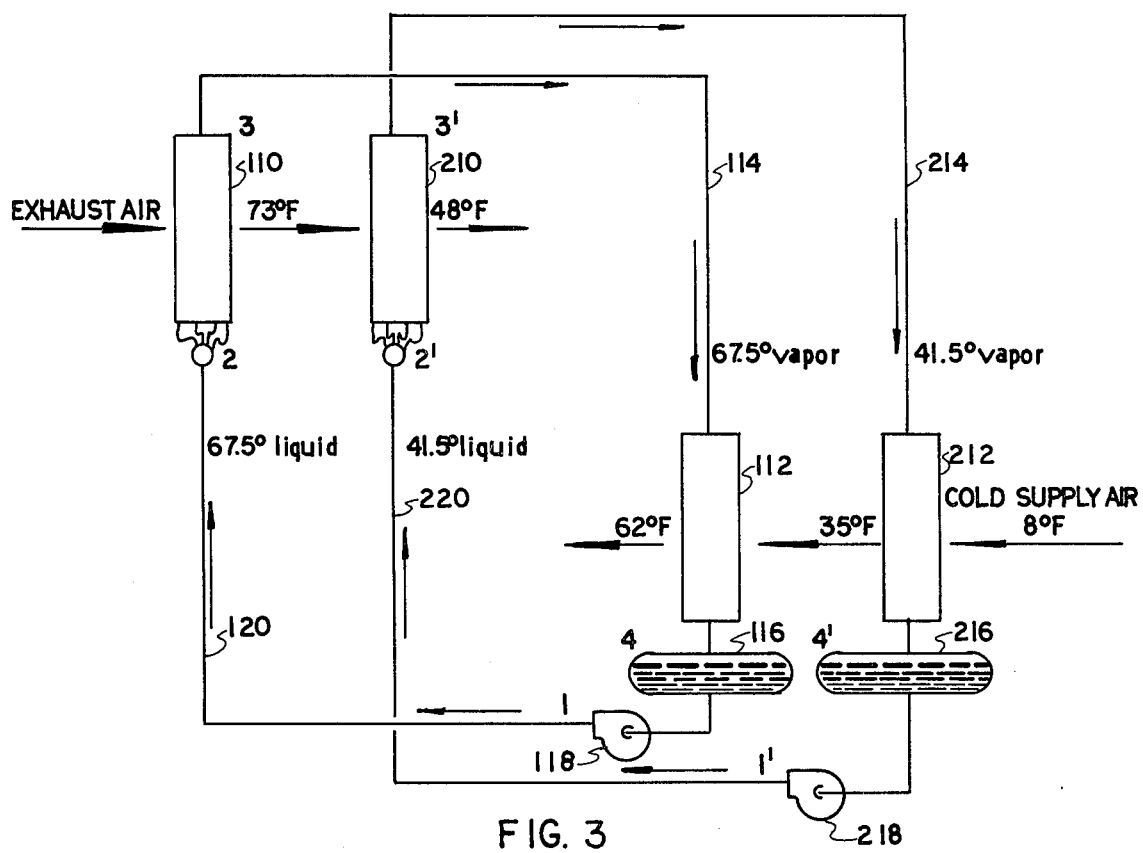
FIG. 3 is a schematic representation of the preferred system utilizing two loops in counter flow arrangement.

Turning now to FIG. 3, in a preferred embodiment there are provided two loops, so that the maximum efficiency to cost can be obtained. In this set-up, a first evaporator or heat exchanger 110 is placed in the upstream end of the exhaust airstream to first confront the exhaust air. Evaporator 110 is connected to condenser 112 by conduit 114, which in turn is placed in the downstream end of the supply airstream. Again the condensate from condenser 112 collects in a receiver 116 from whence it is pumped by pump 118 through conduit 120 back to the evaporator 110. A second loop is provided which includes a second evaporator or heat exchanger 220 placed on the downstream side of the exhaust airstream from which vapor passes through conduit 214 into condenser 212 which is placed in the upstream end of the supply airstream. Again the condensate from condenser 212 is collected in receiver 216 and pumped back to evaporator 210 by means of pump 218 through conduit 220.

Figure 4:
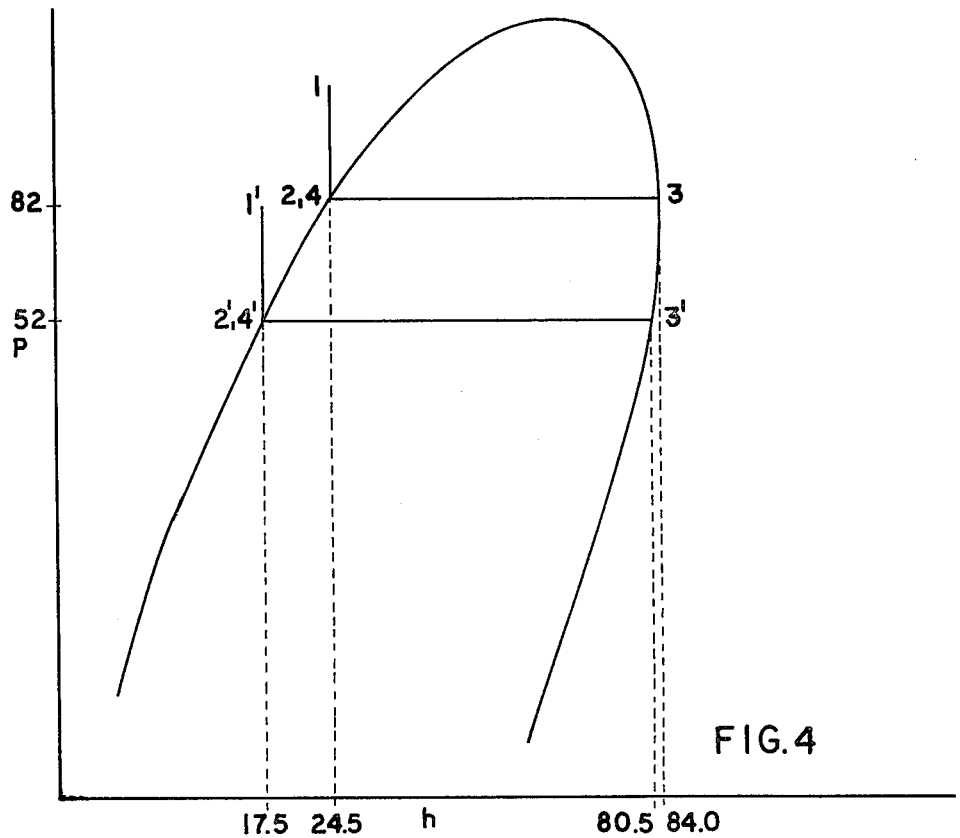
FIG. 4 is an enthalpy/pressure curve illustrative of the arrangement of FIG. 3.

The important thing to note about the arrangement of FIG. 3 is that, referring to FIG. 4, the line 3', 4' which represents the latent heat of enthalpy or the heat picked up by the supply airstream is greater than the line 3,4, which illustrates that additional efficiencies can be obtained by adding the second loop. It has been found that the efficiency of the system illustrated in FIGS. 1 and 2 and assuming an exhaust airstream of 100° and a supply airstream of 8° is approximately 40%. Efficiency is defined as the actual temperature rise of the cold airstream divided by the total temperature difference between the exhaust temperature and the supply temperature. The efficiency of the system can be increased to approximately 60% by the arrangement illustrated in FIG. 3. The two systems are arranged in counterflow so that the hot exhaust air entering the first coil 110 sees a higher evaporating temperature than the air entering the second coil 210.

There is thus shown and described a new and unique approach to air treatment systems in which considerable efficiencies can be obtained in a system where the incoming air supply and the exhaust airstreams are separated, and at the same elevation or in which the incoming airstream can be at an elevation higher than the exhaust airstream making a very practical arrangement. While the invention has been described in detail hereinabove, it is obvious that certain changes and modifications might be made without departing from the scope of the invention which is set forth in the following claims.

What is claimed is:

1. A heat exchange system for use in connection with an air treatment system for commercial buildings and work environments, which system includes an incoming and exhaust airstream; said system comprising:
   (a) a heat exchange means placed in heat exchange relationship with each airstream;
   (b) a supply conduit and a return conduit connecting each of said heat exchange means;
   (c) a two-phase working fluid so selected as to change phase at temperatures below that of the warmer of said airstreams and above that of the cooler of said airstream;
   (d) a pump means in one of said conduits for pumping condensed refrigerant from the heat exchanger in the cooler of said airstream to the heat exchanger in the other airstream;
   (e) whereby heat is removed from the warmer of said airstreams, regardless of whether the two airstreams are adjacent each other or separated by considerable distance, and regardless of whether there is a difference in elevation between said airstreams.

2. The system according to claim 1 wherein said heat exchange means comprises a finned tube coil.

3. The system according to claim 1 wherein a working-fluid reservoir is provided in the downstream side of one of the conduits between the heat exchanger of the cooler airstream and said pump means.

4. The system according to claim 1 wherein said heat exchange means includes two finned tube coils placed in the warmer airstream and two finned coils placed in the cooler airstream, the upstream coil in the warmer airstream being connected with the downstream coil in the cooler airstream by conduits and the downstream coil in the warmer airstream being connected to the upstream coil in the cooler of said airstreams by separate conduits, whereby the hot exhaust air entering the first coil sees a higher evaporating temperature than the air entering the second or downstream coil.

5. An air treatment system comprising:
   (a) a warm airstream and a cool airstream, said two airstreams being separated by a distance of fifty feet or more;
   (b) a heat exchange means in each airstream;
   (c) said heat exchange means being connected by a supply and return conduit;
   (d) a two-phase working fluid carried by said conduits and heat exchangers; and
   (e) a reversible pump means in the conduit connecting the working fluid output of the cooler airstream to the warmer airstream for pumping refrigerant from the heat exchanger in the cooler of said airstreams to overcome head and line loss.

6. The system according to claim 5 and further including a working fluid reservoir between the working fluid output of said heat exchanger in the cooler airstream and said pump means whereby the condensing surface of said cooler airstream heat exchanger is maximized.

* * * * *